US010567781B2

(12) United States Patent
Dai et al.

(10) Patent No.: US 10,567,781 B2
(45) Date of Patent: Feb. 18, 2020

(54) PROGRESSIVE I-SLICE REFERENCE FOR PACKET LOSS RESILIENT VIDEO CODING

(71) Applicant: Agora Lab, Inc., Santa Clara, CA (US)

(72) Inventors: Wei Dai, Shanghai (CN); Sheng Zhong, Santa Clara, CA (US)

(73) Assignee: Agora Lab, Inc., Santa Clara, CA (US)

( * ) Notice: Subject to any disclaimer, the term of this patent is extended or adjusted under 35 U.S.C. 154(b) by 0 days.

(21) Appl. No.: 15/967,754

(22) Filed: May 1, 2018

(65) Prior Publication Data
US 2019/0342567 A1 Nov. 7, 2019

(51) Int. Cl.
| H04N 19/44 | (2014.01) |
| H04N 19/159 | (2014.01) |
| H04N 19/176 | (2014.01) |
| H04N 19/51 | (2014.01) |
| H04N 19/174 | (2014.01) |

(52) U.S. Cl.
CPC ........... *H04N 19/44* (2014.11); *H04N 19/159* (2014.11); *H04N 19/174* (2014.11); *H04N 19/176* (2014.11); *H04N 19/51* (2014.11)

(58) Field of Classification Search
CPC ...... H04N 19/44; H04N 19/174; H04N 19/51; H04N 19/159; H04N 19/176
USPC .................................................. 375/240.12
See application file for complete search history.

(56) References Cited

U.S. PATENT DOCUMENTS

| 8,964,833 | B2 * | 2/2015 | Auwera | H04N 19/159 |
| | | | | 375/240.03ke |
| 2008/0186404 | A1 * | 8/2008 | Bull | H04N 19/139 |
| | | | | 348/616 |
| 2010/0296579 | A1 * | 11/2010 | Panchal | H04N 19/172 |
| | | | | 375/240.15 |
| 2013/0101033 | A1 * | 4/2013 | Joshi | H03M 7/3068 |
| | | | | 375/240.12 |
| 2013/0177084 | A1 * | 7/2013 | Wang | H04N 19/176 |
| | | | | 375/240.16 |
| 2013/0279606 | A1 * | 10/2013 | Vanam | H04N 19/172 |
| | | | | 375/240.27 |
| 2013/0287103 | A1 * | 10/2013 | Seregin | H04N 19/70 |
| | | | | 375/240.12 |

(Continued)

OTHER PUBLICATIONS

Wang et al, Error resilient video coding techniques (Year: 200).*
Guo et al, Erro resilient coding and error concealment in scalable video coding (Year: 2009).*

*Primary Examiner* — Shan E Elahi
(74) *Attorney, Agent, or Firm* — Young Basile Hanlon & MacFarlane, P.C.

(57) ABSTRACT

A method for decoding a compressed video stream is disclosed. The method includes decoding, by a processor from the compressed video stream, a first picture and a second picture, each including multiple slices in the same pattern, in which the first picture includes a first I-slice decoded using intra-prediction, the second picture includes a second I-slice decoded using intra-prediction, and the first I-slice and the second I-slice are not co-located with each other; and decoding, using inter-prediction, a first P-slice of the current picture referencing the first I-slice, and a second P-slice of the current picture referencing the second I-slice, in which the first P-slice of the current picture is co-located with the first I-slice, and the second P-slice of the current picture is co-located with the second I-slice.

20 Claims, 9 Drawing Sheets

(56) References Cited

U.S. PATENT DOCUMENTS

| | | | |
|---|---|---|---|
| 2014/0092969 A1* | 4/2014 | Lee | H04N 19/433 |
| | | | 375/240.15 |
| 2014/0105299 A1* | 4/2014 | Chen | H04N 19/597 |
| | | | 375/240.15 |
| 2014/0301464 A1* | 10/2014 | Wu | H04N 19/105 |
| | | | 375/240.15 |
| 2015/0326880 A1* | 11/2015 | He | H04N 19/597 |
| | | | 375/240.13 |
| 2016/0366445 A1* | 12/2016 | Lin | H04N 19/172 |

* cited by examiner

US 10,567,781 B2

PROGRESSIVE I-SLICE REFERENCE FOR PACKET LOSS RESILIENT VIDEO CODING

TECHNICAL FIELD

This disclosure relates to video coding, and in particular to network-based packet loss resilient video coding using progressive I-slice references.

BACKGROUND

Reference pictures are widely used by video encoders and decoders (e.g., MPEG2, H.264, and H.265) for motion estimation (ME) and motion compensation (MC) to reduce inter-frame redundancy. In network-based (e.g., Internet-based) video transmission, an encoded bitstream including reference pictures can be transmitted, using packets as transmission units, over a network to a receiving decoder. When jamming occurs in the network, a packet can be lost during transmission or delayed at the decoder (which is deemed as lost). Packet loss can cause loss of a whole or a part of the picture, such as a slice. When the lost packet includes information to be used as part of a reference picture, the decoding process will suffer because future pictures rely on the lost information for decoding.

One type of reference pictures, the I-picture, is prone to packet loss. I-pictures typically need more bits (e.g., multiple times that needed by P-pictures) to encode. In addition, I-pictures need more packets and bandwidth to transmit and typically cause a network burst.

To alleviate difficulties caused by a network jam, one solution is to resend the lost packets of a key picture (e.g., an I-picture). However, resending the lost packets causes additional network traffic, which could further aggravate the network jam.

SUMMARY

Disclosed herein are implementations of methods, apparatuses, and systems for multiple description coding based on integer operations.

In one aspect, a method for decoding a compressed video stream is disclosed. The method includes decoding, by a processor from the compressed video stream, a first picture and a second picture, each comprising multiple slices in the same pattern, wherein the first picture comprises a first I-slice decoded using intra-prediction, the second picture comprises a second I-slice decoded using intra-prediction, and the first I-slice and the second I-slice are not co-located with each other, and decoding, using inter-prediction, a first P-slice of the current picture referencing the first I-slice, and a second P-slice of the current picture referencing the second I-slice, wherein the first P-slice of the current picture is co-located with the first I-slice, and the second P-slice of the current picture is co-located with the second I-slice.

In another aspect, a method for encoding a video stream is disclosed. The method includes receiving, by a processor, a first picture, a second picture, and a current picture, each of the first picture, the second picture, and the current picture divided into slices in the same pattern, determining a first slice from slices of the first picture and a second slice from slices of the second picture, wherein the first and second slices are not co-located with each other, and encoding, using intra-prediction, the first slice as a first I-slice and the second slice as a second I-slice, and, using inter-prediction, a slice of the current picture co-located with the first I-slice referencing the first I-slice, and a slice of the current picture co-located with the second I-slice referencing the second I-slice.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
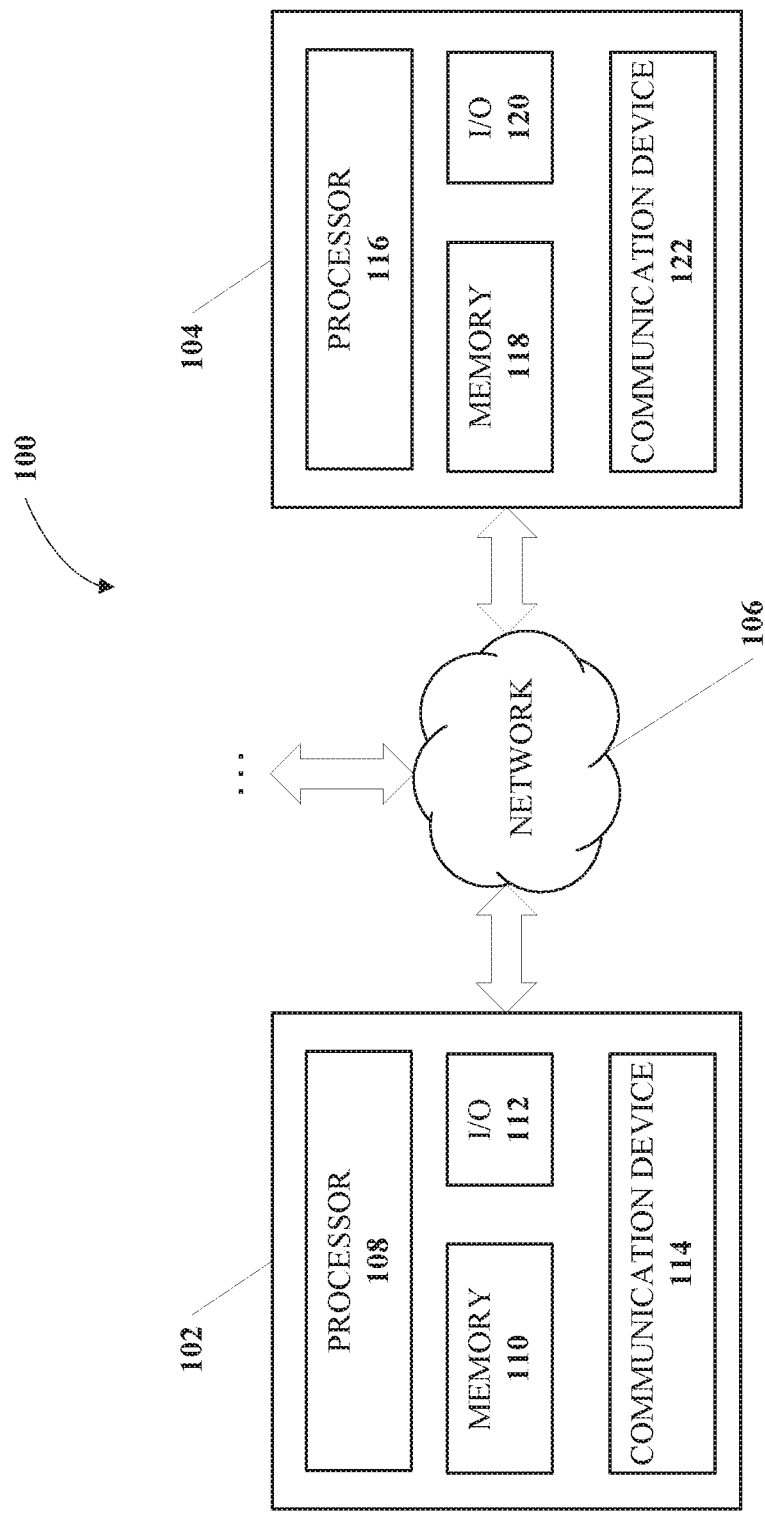
FIG. 1 is a diagram of an example system for media transmission according to implementations of this disclosure.

Online multimedia data sharing, such as a video conference call, a live-stream video broadcasting, or an Internet phone service, requires media data transmission with efficiency and fidelity. The media data can include audio data, video data, or any multimedia data including an audio sequence or a video sequence. Typically, media data can be stored in its original form or converted to form a video stream. The video stream can include time sequence data (e.g., an audio sequence including multiple audio samples, or a video sequence including multiple pictures or frames), feature extracted residuals of the video stream (e.g., a residual picture after inter-prediction for a current picture in a video sequence), or equivalent quantities of the video stream in a transformed domain (e.g., transformed and/or quantized coefficients). The video stream can be encoded (or "compressed") into a compressed video stream (e.g., a video bitstream) for transmission over a network. The compressed video stream can be transmitted over a network (e.g., the Internet) in data packets (or "packets" for simplicity).

When encoding a video stream (or referred to as a "video sequence"), each picture of the video stream can be encoded using information within the same picture for prediction (referred to as "intra-picture prediction" or "intra-prediction"), or information between different pictures for prediction (referred to as "inter-picture prediction" or "inter-prediction"). In inter-prediction, motion estimation (ME)

and motion compensation (MC) can be performed between at least two different pictures. A picture coded using intra-prediction can be referred to as an "I-picture," and a picture coded using inter-prediction can be referred to as a "P-picture." When decoding, the I-picture can be decoded without referencing another picture. The P-picture can be decoded using another picture as a reference (referred to as a "reference picture"). The reference picture can be an I-picture or another P-picture. The encoder can decide the mode of prediction for a picture being encoded (referred to as a "current picture"). When a picture is being decoded (also referred to as a "current picture"), the decoder can determine which mode of prediction to use based on information received and extracted from a header of the current picture. Details of the video encoding and decoding process will be described in FIGS. 3-4.

During encoding and decoding, the picture can be divided or segmented into one or more partitions. Each partition can be a unit for performing the prediction (e.g., ME and MC). In other words, the prediction can be performed within the range of each partition. A partition can include one or more blocks of the picture. For example, the partition can be a slice or a tile. A slice coded using intra-prediction can be referred to as an "I-slice," and a slice coded using inter-prediction can be referred to as a "P-slice." The encoded I- and P-slices can be transmitted over the network in packets. Details of the structure of a picture in a video stream will be described in FIG. 2.

According to implementations of this disclosure, the disclosed methods, apparatuses, and systems can encode and decode a compressed video stream for network transmission using a progressive I-slice reference. The pictures are divided into slices in the same pattern and can be grouped for implementing the progressive I-slice reference—based encoding and decoding. In each group of pictures, some pictures can include I-slices. Such pictures can be used as reference pictures. The I-slices can represent different regions in a picture. For example, the I-slices can be complementary, such that an aggregation of them can form a virtual picture. The virtual picture is not an actual picture of the compressed video stream. That is, the slices of the virtual picture are the I-slices from different pictures. The area of the virtual picture can cover (e.g., be equal to) the area of a whole picture of the compressed video stream. For ease of explanation without causing ambiguity, such complementary I-slices will be referred to as being able to "cover a whole picture" hereinafter unless explicitly described otherwise. Each reference picture can have one of the I-slices and one or more P-slices. In other words, the I-slices that can be aggregated to cover a picture can be distributed in the reference pictures progressively along the time line and be used as reference slices for encoding and decoding; thus, such I-slices can be referred to as "progressive I-slice references" or "progressive I-slices" for simplicity. Other pictures in the group of pictures can use the progressive I-slices as references for inter-prediction—based encoding and decoding. For example, any P-slice of a picture of the video stream can be encoded or decoded referencing its co-located I-slice. By distributing the progressive I-slices into different pictures, effects of packet loss during network transmission can be minimized, and network burst can be reduced or avoided. Details of the disclosed methods, apparatus, and systems will be set forth below.

FIG. 1 is a diagram of an example system 100 for media transmission according to implementations of this disclosure. As shown in FIG. 1, the system 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, for example, a web host or a cloud service provider. In some implementations, the computing device can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers/processors with a computer program that, when executed, carries out any of the respective methods, algorithms, and/or instructions described herein. In addition, or alternatively, for example, special-purpose computers/processors including specialized hardware can be utilized for carrying out any of the methods, algorithms, or instructions described herein.

The apparatus 102 can have an internal configuration of hardware including a processor 108 and a memory 110. The processor 108 can be any type of device or devices capable of manipulating or processing information. In some implementations, the processor 108 can include a central processor (e.g., a central processing unit or CPU). In some implementations, the processor 108 can include a graphics processor (e.g., a graphics processing unit or GPU). In some implementations, the processor 108 can include a special dedicated hardware accelerating processor. Although the examples herein can be practiced with a single processor as shown, advantages in speed and efficiency can be achieved using more than one processor. For example, the processor 108 can be distributed across multiple machines or devices (each machine or device having one or more processors) that can be coupled directly or connected via a network (e.g., a local area network). The memory 110 can include any transitory or non-transitory device or devices capable of storing codes and data that can be accessed by the processor (e.g., via a bus). The memory 110 herein can be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 110 can be distributed across multiple machines or devices, such as in the case of a network-based memory or cloud-based memory. The memory 110 can include data (not shown), an operating system (not shown), and an application (not shown). The data can include any data for processing (e.g., an audio stream, a video stream, or a multimedia stream). The application can include programs that permit the processor 108 to implement instructions to generate control signals for performing functions of the methods in the following description.

In some implementations, in addition to the processor 108 and the memory 110, the apparatus 102 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disk drive, a solid-state drive, a flash drive, or an optical drive. Further, the secondary storage device can be a component of the apparatus 102 or can be a shared device accessible via a network. In some implementations, the application in the memory 110 can be stored in whole or in part in the secondary storage device and loaded into the memory 110 as needed for processing.

In addition to the processor 108 and the memory 110, the apparatus 102 can include input/output (I/O) devices. For example, the apparatus 102 can include an I/O device 112. The I/O device 112 can be implemented in various ways, for example, it can be a display that can be coupled to the apparatus 102 and configured to display a rendering of graphics data. The I/O device 112 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The I/O device 112 can also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device. If the I/O device 112 is a display, for example, it can be a liquid crystal display (LCD), a cathode-ray tube (CRT), or any other output device capable of providing a visible output to an individual. In some cases, an output device can also function as an input device—a touchscreen display configured to receive touch-based input, for example.

The I/O device 112 can alternatively or additionally be formed of a communication device for transmitting signals and/or data. For example, the I/O device 112 can include a wired means for transmitting signals or data from the apparatus 102 to another device. For another example, the I/O device 112 can include a wireless transmitter or receiver using a protocol compatible to transmit signals from the apparatus 102 to another device or to receive signals from another device to the apparatus 102.

In addition to the processor 108 and the memory 110, the apparatus 102 can optionally include a communication device 114 to communicate with another device. Optionally, the communication can be via a network 106. The network 106 can be one or more communications networks of any suitable type in any combination, including, but not limited to, networks using Bluetooth communications, infrared communications, near field connections (NFCs), wireless networks, wired networks, local area networks (LANs), wide area networks (WANs), virtual private networks (VPNs), cellular data networks, or the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the apparatus 102 to provide functions of communication with the network 106.

Similar to the apparatus 102, the apparatus 104 includes a processor 116, a memory 118, an I/O device 120, and a communication device 122. The implementations of elements 116-122 of the apparatus 104 can be similar to the corresponding elements 108-114 of the apparatus 102. For example, the apparatus 102 can be used as a decoding apparatus (referred to as a "decoder"), and the apparatus 104 can be used as an encoding device (referred to as an "encoder"), or vice versa. The apparatus 102 can communicate with the apparatus 104 via the network 106. The apparatuses 102 and 104 can also communicate with other apparatuses (not shown) connected to the network 106.

The apparatuses 102 and 104 (and any algorithms, methods, instructions, etc., stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably. Further, portions of the apparatuses 102 and 104 do not necessarily have to be implemented in the same manner.

It should be noted that parts or components of the progressive I-slice compatible coding devices (e.g., apparatuses 102 and 104) and systems can include elements not limited to those shown in FIG. 1. Without departing from the scope of this disclosure, the progressive I-slice compatible coding devices and systems can include more or fewer parts, components, and hardware or software modules for performing various functions in addition or related to encoding and decoding.

Figure 2:
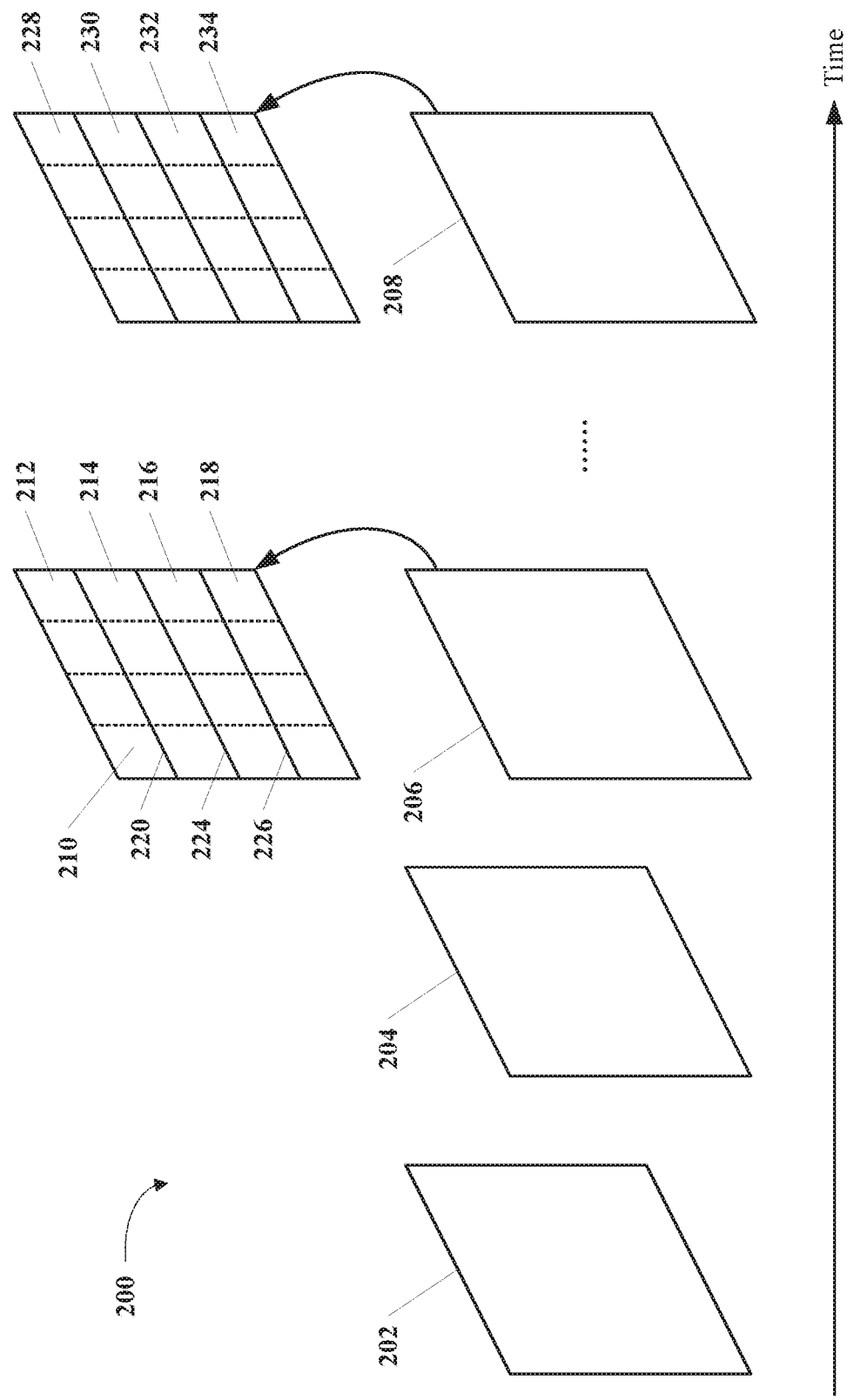
FIG. 2 is a diagram of example pictures of a video stream.

FIG. 2 shows example pictures of a video stream 200. The video stream 200 can be a video source stream for encoding or a video stream decoded from a video bitstream. A timeline is shown in FIG. 2, the arrow of which indicates the direction of time. The video stream 200 can include a series of pictures along the timeline, including pictures 202-208. For example, the picture 208 can be the current picture. If the picture 208 is being encoded or decoded using inter-prediction (i.e., the picture 208 is a P-picture), its reference picture is temporally prior to the same. That is, the reference picture for the picture 208 as a P-picture can be the picture 206, 204, 202, or any picture earlier in the timeline than the picture 208.

Each picture of the video stream 200 can be divided into multiple processing units. ME and MC can be performed on the level of the processing units. In some video coding standards, the processing units can be referred to as "macroblocks" or "coding tree blocks" (CTBs). In some implementations, each processing unit can be further divided into one or more processing sub-units for ME and MC, in which the processing sub-units are referred to as "prediction blocks" or "coding units" (CUs) depending on the standards. The size and shape of the processing units and sub-units can be arbitrary, such as 8×8, 8×16, 16×16, 32×32, 64×64, or any size in any shape suitable for encoding a region of the picture. Typically, the more details the region includes, the smaller size the processing units and sub-units can be. For ease of explanation without causing ambiguity, the processing units and sub-units are uniformly referred to as "blocks" hereinafter unless explicitly described otherwise. For example, in FIG. 2, the picture 206 can be shown to have 4×4 blocks, including a block 210. The boundaries of the blocks are shown in dotted lines.

In some implementations, the blocks can be grouped, forming a special region or partition of the picture. In other words, the picture can be divided into one or more regions or partitions, and each region or partition can include one or more blocks. Such regions or partitions can be referred to as "slices," "tiles," or any other name depending on the video coding standards. For ease of explanation without causing ambiguity, such regions or partitions are referred to as "slices" hereinafter unless explicitly described otherwise herein. For example, the picture 206 can be divided into four slices 212-218, each slice having four blocks. The slices 212-218 can have boundaries 220-226 in between, shown as solid lines.

Slices can be used for parallel processing. ME and MC can be performed for blocks belonging to one slice (i.e., ME and MC will not be performed using blocks outside the slice), and the encoding can be performed simultaneously and independently for the slices. For example, the slices 212-218 can be parallelly processed, which can increase the efficiency of video encoding. Similarly, the slices can also be parallelly decoded at a decoder. Slices of an I-picture can be I-slices, and slices of a P-picture can be P-slices.

For P-slices, ME and MC can be performed between two or more co-located slices in some implementations. As used herein, the term "co-located" refers to two slices in two respective pictures having the same size, same shape, and same location in the picture. The location of a slice in a picture refers to the relative position of the slice within the picture. The location can be determined using a part of the slice as a reference point. For example, the reference point can be within a block of the slice at the center, a corner, a boundary, or any position of the slice. For example, for two slices in two pictures having the same size and shape, if the top left corners of the two slices have the same positions (e.g., coordinates) in the picture, the two slices are "co-located." For example, slices 228-234 of the picture 208 are co-located with the slices 212-218 of the picture 206, respectively. If the slice 228 is a P-slice, it can use the co-located slice 212 as its reference slice. In some other implementations, for P-slices, ME and MC can be performed between two or more non-co-located slices. For example, if the slice 228 is a P-slice, it can use the non-co-located slice 214, 216, or 218 as its reference slice.

It should be noted that the slice herein can include any number of any blocks in any configuration, and is not limited to the aforementioned examples (e.g., the slices 212-218). For example, the slice can be in a non-rectangular shape, such as including blocks of different rows (not shown). For another example, the slice can include blocks grouped in a non-contiguous manner, such as two or more non-contiguous block groups. For another example, a part of a first slice can be within a part of a second slice. For another example, the first slice can be enclosed by the second slice (e.g., the first slice can be within the second slice).

It should also be noted that the division or segmentation of the slices can be changed or unchanged in the video stream. In other words, the boundaries between the slices can be changed or unchanged. In some implementations, the pictures of the video stream can be divided into slices in the same pattern. In some implementations, the pattern of the slice division can change between different sets of pictures of the video stream.

Figure 3:
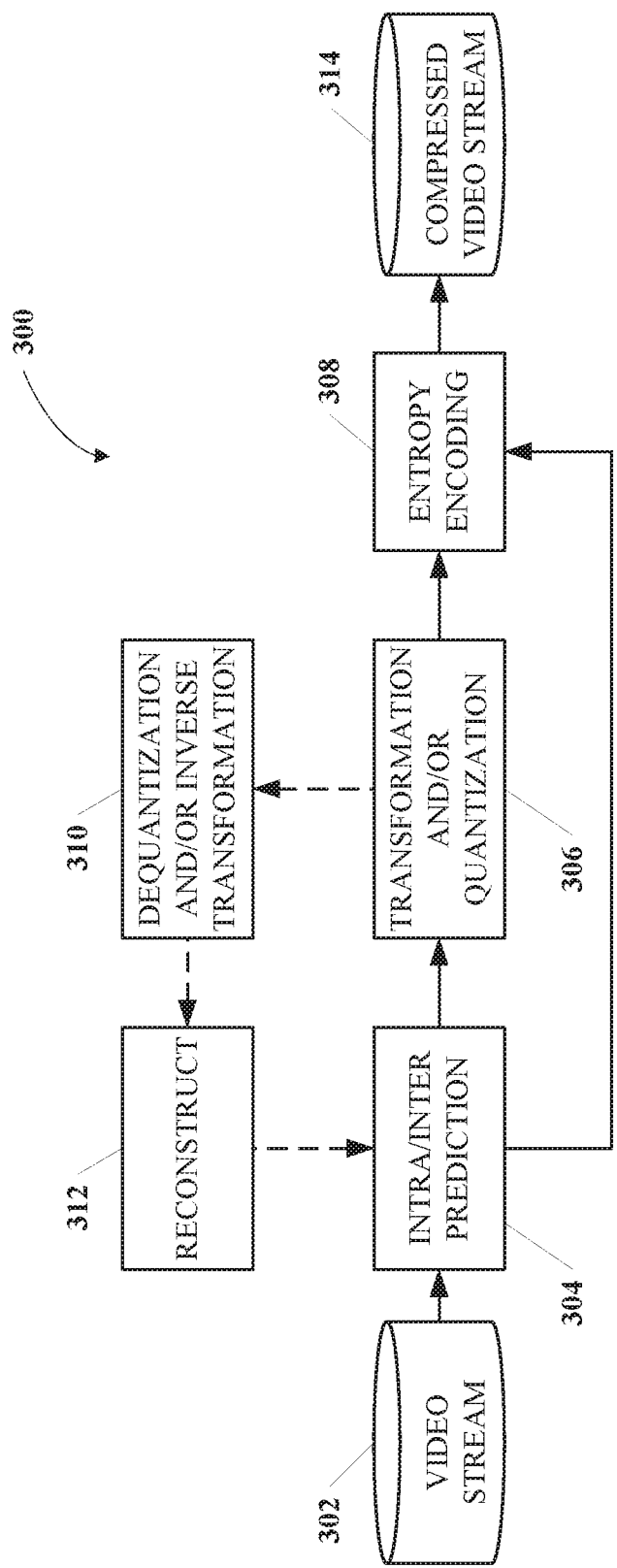
FIG. 3 is a diagram of an example encoding process that can be used according to implementations of this disclosure.

FIG. 3 is a diagram of an example process 300 for encoding a video stream 302 according to implementations of this disclosure. The video stream 302 can include a video sequence. The process 300 can be implemented as software and/or hardware modules in the system 100 in FIG. 1. For example, the process 300 can be implemented as modules included in an encoder (e.g., the apparatus 104 in FIG. 1). The process 300 includes operations 304-308 to produce as an output a compressed video stream 314 from a video stream 302. The example encoding process 300 (either the whole process or some stages) can be further modified when implementing the progressive I-slice reference—based encoding of FIG. 5 described below. In some instances, the process 300 may not be necessary for the implementations of progressive I-slice reference—based encoding.

Referring to the process 300 in FIG. 3, the video stream 302 is received by an encoder. The term "receive" as used herein can refer to receiving, inputting, acquiring, retrieving, obtaining, reading, accessing, or any action for inputting information or data in any manner. For example, the video stream 302 can be a video sequence that includes a series of video pictures (e.g., a current picture).

Generally, an encoding process can include one or more of the following stages or operations: a prediction stage (e.g., for intra-prediction or inter-prediction), a transformation stage (with or without quantization), and an entropy encoding stage. The aforementioned stages can be used to output the compressed video stream 314 from the video stream 302 in a forward path of the encoding process, as shown by the solid connection lines in FIG. 3: an intra/inter prediction stage 304, a transformation and/or quantization stage 306, and an entropy encoding stage 308.

At the intra/inter prediction stage 304, for intra-prediction, a current block of the current picture can be predicted using previously coded block(s) from the current picture. For inter-prediction, the current block of the current picture can be predicted using previously coded pictures as reference data. Previously coded pictures can include, for example, previously encoded and reconstructed pictures also referred to as reference pictures. For example, ME and MC can be performed using the current picture and one or more reference pictures to generate motion data. A residual, which is the difference between a predicted block and the current block, can be further transformed, quantized, and/or entropy encoded.

In some implementations, optionally, a loop filter (not shown) can be additionally applied before the entropy encoding stage 308. The loop filter can reduce distortion (e.g., blocking artifacts) introduced by the video compression. Other information used to decode the resultant video bitstream can also be entropy encoded, such as the prediction mode, transformation type, quantization level, and loop filter parameters (e.g., filter strength).

In some implementations, the process 300 can further include a reconstruction path for reconstructing reference data to be used for predicting a future picture. For example, the reconstruction path (shown by the dashed connection lines in FIG. 3) can include the following stages: a dequantization and/or inverse transformation stage 310 and a reconstruction stage 312. The stages 310 and 312 can be used to ensure that both the encoder (e.g., the apparatus 104 in FIG. 1) and the decoder (e.g., the apparatus 102 in FIG. 1) can use the same reference data for prediction. In some implementations, optionally, a loop filter (not shown) can be additionally applied after the stage 312. In other implementations, the reconstructed picture can be used without using the loop filter. The reconstruction can be similar to a reconstruction stage in a decoding process (e.g., stage 410 in FIG. 4).

It should be noted that other variations of the encoding process can be used to encode the video sequence. The encoding process can be performed in different orders, combined into fewer stages, and/or divided into more stages. For example, quantization or transform can be optional in some implementations. As an example, a non-transform based encoder can quantize the residual data without transformation.

Figure 4:
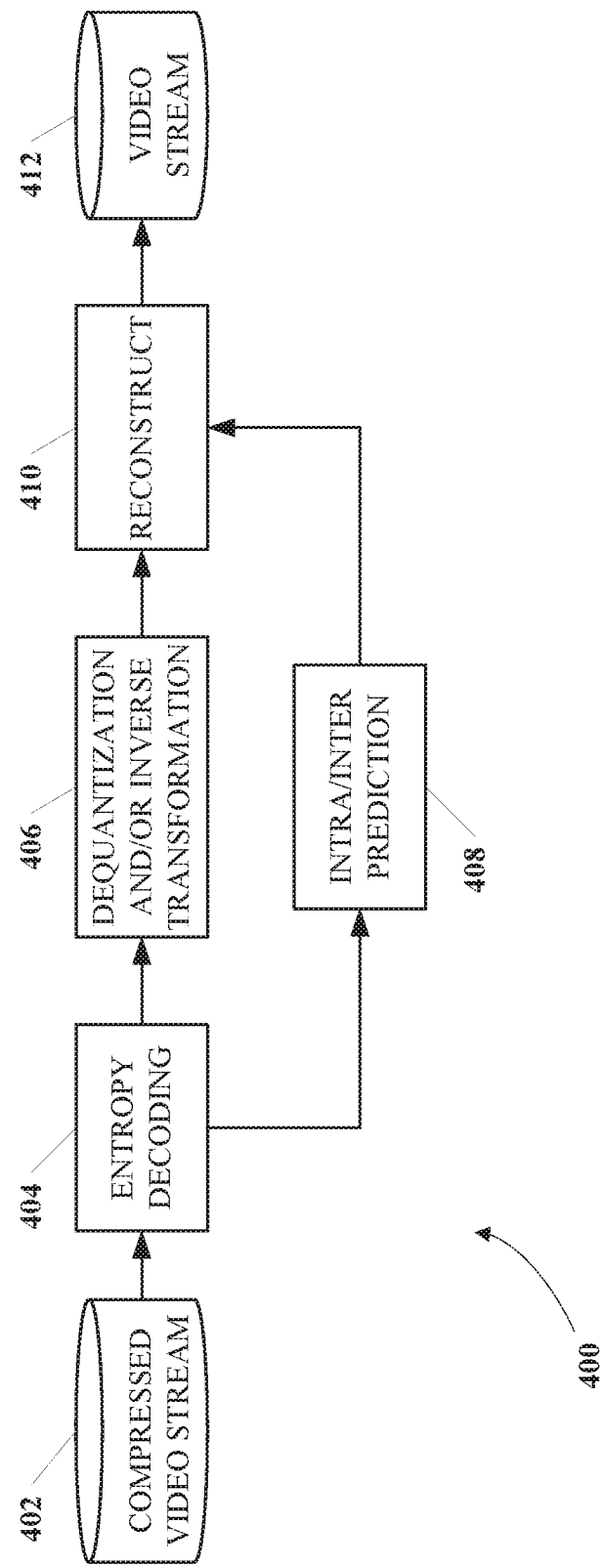
FIG. 4 is a diagram of an example decoding process that can be used according to implementations of this disclosure.

FIG. 4 is a diagram of an example process 400 that can be used to decode a compressed video stream according to implementations of this disclosure. The process 400 can be implemented as software and/or hardware modules in the system 100 in FIG. 1. For example, some or all stages of the process 400 can be implemented as software or hardware modules included in the system 100 by a decoder (e.g., the apparatus 102). The decoder can be implemented by program codes stored in memory (e.g., the memory 110). The program codes can include computer-readable instructions that, when executed by a processor (e.g., the processor 108), cause the decoder to decode a compressed video stream in the manner described in FIG. 4. The decoder can also be implemented as specialized hardware included in an apparatus (e.g., the apparatus 102). For example, the decoder can be a hardware decoder. The process 400 includes operations 404-410 to reconstruct a video stream 412 from a compressed video stream 402. In addition, the example decoding process 400 (either the whole process or some stages) can be modified when implementing progressive I-slice reference—based decoding of FIG. 6 described below.

Generally, when decoding a compressed video stream, the decoding process is similar to the reconstruction path of the video encoding process. The process 400, similar to the reconstruction path of the process 300 discussed above, can include the following stages: an entropy decoding stage 404, a dequantization and/or inverse transformation stage 406, an intra/inter prediction stage 408, and a reconstruction stage 410. The reconstructed picture can be used as future reference data for processing a future picture successive to the current picture. In addition to being outputted in the video stream 412, the reconstructed picture can also be stored in a buffer (e.g., in the memory 110 in FIG. 1) to be used as the future reference data. In some implementations, the reconstructed picture can be filtered using a loop filter (not shown). Other structural variations of the process 400 can be used to decode the compressed video stream 402.

Figure 5:
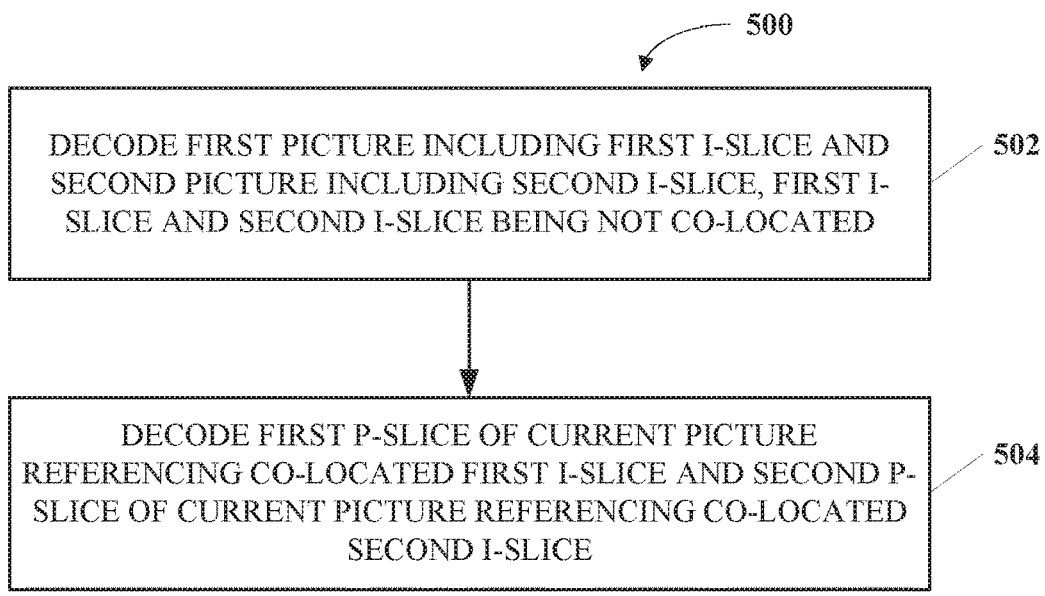
FIG. 5 is a flowchart of an example process for decoding a compressed video stream using progressive I-slice references according to implementations of this disclosure.

FIG. 5 is a flowchart of an example process 500 for decoding a compressed video stream using progressive I-slice references according to implementations of this disclosure. The process 500 can be implemented as software and/or hardware modules in the system 100 in FIG. 1. For example, the process 500 can be implemented as software modules stored in the memory 110 as instructions and/or data executable by the processor 108 of the apparatus 102 as a decoder. For another example, the process 500 can be implemented in hardware as a specialized chip storing instructions executable by the specialized chip. Some or all of the operations of the process 500 can be implemented at stages of the process 400 in FIG. 4.

At operation 502, a first picture and a second picture are decoded from the compressed video stream. For example, the compressed video stream can be the compressed video stream 402 in FIG. 4. Each of the first and second pictures can include multiple slices. The division of the multiple slices can be determined by an encoder. The slices of the first and second pictures can be divided in the same pattern. In other words, the boundaries of the slices across the pictures of the video stream can have the same relative locations in a picture.

The first picture can include a first I-slice that can be decoded using intra-prediction. The second picture can include a second I-slice that can be decoded using intra-prediction. The first and the second I-slices can correspond to different locations of a current picture. For example, the first, second, and current pictures can be shown in FIG. 7.

Figure 7:
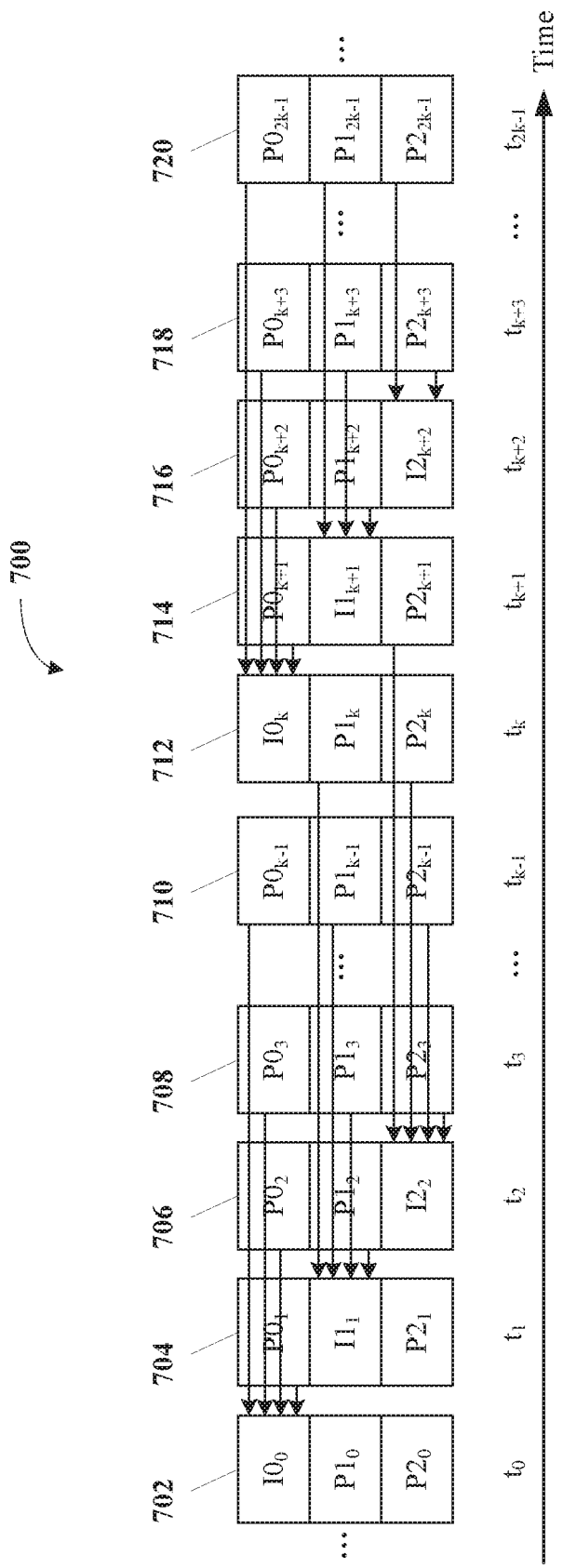
FIG. 7 is a diagram of pictures of a video stream showing first example progressive I-slice references according to implementations of this disclosure.

FIG. 7 is a diagram of pictures of a video stream 700 showing first example progressive I-slice references according to implementations of this disclosure. A timeline is shown in FIG. 7 indicating the direction of time. The video stream 700 can include pictures 702-720, which can be decoded in a temporal order (i.e., from left to right along the timeline). Timestamps are shown under some pictures, such as timestamps $t_0$, $t_1$, $t_2$, and $t_3$ corresponding to the pictures 702, 704, 706, and 708, respectively, and timestamps $t_{k-1}$, . . . $t_{k+3}$ corresponding to the pictures 710, 712, 714, 716, and 718, respectively. Each picture in the video stream 700 can be divided into multiple slices. As shown in FIG. 7, each picture is divided into three slices in the same pattern.

Referring back to FIG. 5, at operation 504, a first P-slice of the current picture is decoded using inter-prediction referencing the first I-slice, and a second P-slice of the current picture is decoded using inter-prediction referencing the second I-slice. In other words, the first and second P-slices of the current picture are decoded using the first and second I-slices as reference slices for inter-prediction, respectively. The first P-slice of the current picture can be co-located with the first I-slice. The second P-slice of the current picture can be co-located with the second I-slice.

In FIGS. 7-10, intra-prediction coded (e.g., encoded and/or decoded) slices are symbolized with the starting letter "I" (e.g., $I0_0$, $I1_1$, and $I2_2$), and inter-prediction coded slices are symbolized with the starting letter "P" (e.g., $P1_0$, $P2_1$, and $P0_3$). The number in a slice symbol following the letter "I" or "P" indicates a location index of the slice (e.g., 0, 1, or 2), and the subscript numbers in the slice symbols indicate the timestamps of the slices (e.g., $t_0$, $t_1$, $t_2$, or $t_3$). For example, the symbol "$P2_1$" indicates that this slice is a P-slice with an index 2 at time $t_1$. As shown in FIG. 7, some pictures can include I- and P-pictures, such as the pictures 702-706. Some pictures can include P-pictures only, such as the pictures 708-710.

For ease of explanation without causing ambiguity, the term "video stream" in FIGS. 7-10 is used to refer to a video sequence or a compressed video stream. Specifically, the term "video stream" refers to a compressed video stream and a video sequence for the descriptions related to FIG. 5 and FIG. 6, respectively.

Referring to FIG. 7, for example, the first and second pictures at the operation 502 can be the pictures 702 and 704, respectively. For another example, the first and second pictures can be the pictures 704 and 702, respectively. It should be noted that terms such as "first," "second," "third," etc., do not have implications of temporal or spatial ordering. Hereinafter, for ease of explanation without causing ambiguity, the first picture is assumed to be earlier than the second picture. The first picture 702 can include an I-slice $I0_0$ as the first I-slice. The second picture 704 can include an I-slice $I1_1$ as the second I-slice. The current picture can be any picture temporally after the pictures 702 and 704 (e.g., any of the pictures 706-720). For example, the current picture can be the picture 706. As shown in FIG. 7, the I-slices $I0_0$ and $I1_1$ correspond to different locations of the picture 706. The I-slices $I0_0$ and $I1_1$ can be decoded using intra-prediction when the data thereof is received.

For example, in FIG. 7, the first P-slice can be a P-slice $P0_2$ of the current picture 706, which can be decoded using inter-prediction referencing the I-slice $I0_0$ (represented by an arrow pointing from $P0_2$ to $I0_0$). The second P-slice can be a P-slice $P1_2$ of the current picture 706, which can be decoded using inter-prediction referencing the I-slice $I1_1$ (represented by an arrow pointing from $P1_2$ to $I1_1$). The slices $P0_2$ and $I0_0$ are co-located. The slices $P1_2$ and $I1_1$ are co-located. In other words, ME and MC can be performed between $I0_0$ and $P0_2$, and between $I1_1$ and $P1_2$.

In other words, in FIG. 7, when data of the first picture 702 is received, the I-slice $I0_0$ can be decoded using intra-prediction, and the P-slices $P1_0$ and $P2_0$ can be decoded using inter-prediction (e.g., referencing previous co-located slices that are not shown). When data of the second picture 704 is received, the I-slice $I1_1$ can be decoded using intra-prediction. The P-slice $P0_1$ co-located with the I-slice $I0_0$ can be decoded using inter-prediction that references $I0_0$. The P-slice $P2_1$ can be decoded using inter-prediction (e.g., referencing a previous co-located slice that is not shown). When data of the third picture 706 (i.e., a current picture) is received, the I-slice $I2_2$ can be decoded using intra-prediction. The P-slice $P0_2$ co-located with the I-slice $I0_0$ can be decoded using inter-prediction referencing $I0_0$. The P-slice $P1_2$ co-located with the I-slice $I1_1$ can be decoded using inter-prediction referencing $I1_1$. When data of the fourth picture 708 (e.g., a future picture) is received, the P-slices $P0_3$, $P1_3$, and $P2_3$ co-located with the I-slices $I0_0$, $I1_1$, and $I2_2$, respectively, can be decoded using inter-prediction referencing $I0_0$, $I1_1$, and $I2_2$, respectively.

In some implementations, the operations 502-504 can be iterated for groups of pictures. In other words, the video stream 700 can be divided into different groups of pictures (e.g., a first group including the pictures 702-710, and a second group including the pictures 712-720), and the operations 502-504 can be performed for each of the divided groups.

For example, a first number of pictures (i.e., a first group of pictures) can be decoded from the compressed video stream. The first number can be represented by a positive integer k. For example, the k pictures can be the pictures 702-710. Each of the k pictures can include a second number of slices divided in the same pattern. The second number can be represented by a positive integer m. For example, m can be three for the video stream 700. The k pictures 702-710 can include m (e.g., three) I-slices (e.g., the I-slices $I0_0$, $I1_1$, and $I2_2$). As shown in FIG. 7, none of the I-slices $I0_0$, $I1_1$, and $I2_2$ are co-located with each other. That is, the I-slices $I0_0$, $I1_1$, and $I2_2$ correspond to different locations of a picture. Each of the k pictures 702-710 can include at most one of the three I-slices. For example, each of the pictures 702-706 can include one of the I-slices $I0_0$, $I1_1$, and $I2_2$, respectively, and each of the pictures 708-710 can include no I-slice. The I-slices $I0_0$, $I1_1$, and $I2_2$ can be decoded using intra-prediction when the data thereof is received.

When the k pictures are decoded, a third number of slices of the current picture can be decoded using inter-prediction referencing the third number of respective co-located I-slices of the m I-slices. The third number can be represented by a positive integer n. For example, when the current picture is the picture 708 in FIG. 7, n can be three. For example, three P-slices $P0_3$, $P1_3$, and $P2_3$ of the current picture 708 can be decoded using inter-prediction referencing three respective co-located I-slices $I0_0$, $I1_1$, and $I2_2$ (represented by arrows pointing from the P-slices $P0_3$, $P1_3$, and $P2_3$ to the I-slices $I0_0$, $I1_1$, and $I2_2$, respectively). It should be noted that n can be smaller than or equal to m. For example, when the current picture is the picture 706, n can be two. Two P-slices $P0_2$ and $P1_2$ of the current picture can be decoded using inter-prediction referencing two respective co-located I-slices $I0_0$ and $I1_1$.

It should be noted that the pictures 702-706 are not the only pictures that can include one of the m I-slices, and the I-slices can be distributed in any picture of the k pictures. For example, when m is three, the three I-slices $I0_0$, $I1_1$, and $I2_2$ can be distributed in any three respective pictures of the k pictures 702-710. It should also be noted that the m I-slices can be distributed in consecutive or non-consecutive pictures. For example, in FIG. 7, the I-slices $I0_0$, $I1_1$, and $I2_2$ can be distributed in the consecutive pictures 702-706. For another example, the I-slices (not shown) can be distributed in non-consecutive pictures of the video stream 700 (e.g., the pictures 702, 706, and 708). It should also be noted that, when the m I-slices are distributed in consecutive pictures, the consecutive pictures can be located at any position of the group of pictures. For example, as shown in FIG. 7, the three consecutive pictures 702-706 that include the I-slices $I0_0$, $I1_1$, and $I2_2$ are located at the beginning of the k pictures 702-710. For another example, the three consecutive pictures 702-706 can be located at a middle portion or an end portion of the k pictures 702-710 (not shown in FIG. 7). It should also be noted that the ordering of the relative locations of the I-slices in a picture is not limited to the shown examples. For example, in the pictures 702-706 along the timeline, the I-slices $I0_0$, $I1_1$, and $I2_2$ are arranged from top to bottom. For another example, the I-slices can be arranged at any random location of the pictures, such as $I0_0$, $I2_1$, and $I1_2$, or $I2_0$, $I0_1$, and $I1_2$ in three pictures ordered along the timeline (not shown in FIG. 7).

In some implementations, the m I-slices can be complementary to cover a whole picture. For example, in FIG. 7, the slices $I0_0$, $I1_1$, and $I2_2$ are complementary, and a combination thereof can cover a whole picture. That is, the combination of $I0_0$, $I1_1$, and $I2_2$ can form a virtual picture having the same size and shape with any picture in the video stream 700 (e.g., any of the pictures 702-720).

As used herein, the term "progressive" for a decoder refers to a way of receiving and decoding data of I-slices, such that the more pictures are decoded from the received data, the more I-slices can be decoded from those decoded pictures for future inter-prediction. Those decoded I-slices can be aggregated to cover a whole picture in an incremental fashion. For example, for decoding the video stream 700, when the picture 702 is decoded, the I-slice $I0_0$ can be decoded for inter-prediction of co-located slices in the pictures 704-710. The decoded I-slice $I0_0$ can constitute a portion (e.g., one-third) of a whole picture. When the picture 704 is decoded, the I-slice $I1_1$ can be decoded for inter-prediction of co-located slices in the pictures 706-710. The decoded I-slices $I0_0$ and $I1_1$ can be aggregated to cover a larger portion (e.g., two-thirds) of a whole picture. That is, the aggregation of the decoded I-slices is in the incremental fashion. The I-slices $I0_0$ and $I1_1$ can be referred to as "progressive I-slice references" herein.

In some implementations, when the first group of pictures (e.g., the first group including the pictures 702-710) are decoded using the progressive I-slice references, a successive group of pictures (e.g., the second group including the pictures 712-720) can be decoded using the progressive I-slice references based on a new set of I-slices.

For example, after decoding the k pictures, a fourth number of pictures can be decoded from the compressed video stream. The fourth number can be represented by a positive integer p. In some implementations, p can be equal to k. For example, the k pictures can be the pictures 702-710, and the p pictures can be the k pictures 712-720 (i.e., p is equal to k). Each of the p pictures can include three (i.e., m is three) slices divided in the same pattern as the k pictures 702-710.

When the p pictures are decoded, a slice of a picture in the p pictures can be decoded using inter-prediction referencing one of the second I-slices. The slice of the picture can be co-located with the one of the second I-slices. For example, for the picture 712 in the p pictures, a P-slice $P1_k$ can be decoded using inter-prediction referencing the I-slice $I1_1$. Similarly, the P-slices $P2_k$ of the picture 712 and $P2_{k+1}$ of the picture 714 can be decoded referencing the I-slice $I2_2$.

In some implementations, p can be unequal to k. For example, starting from the time $t_0$, a group of pictures (e.g., the first group including the pictures 702-710) of the video stream 700 can be decoded using the progressive I-slice references. After a predetermined time $t_{k-1}$, a new group of pictures (e.g., a new group including the pictures 712, 714, 716, . . . ) of the video stream 700 can be received and decoded using a new set of I-slices (e.g., the I-slices $I0_k$, $I1_{k+1}$, and $I2_{k+2}$). The number of pictures in the new group can be unequal to the pictures 702-710.

As previously described, network-based video transmission can suffer from data packet loss. If all the I-slices are included in one encoded picture (e.g., an I-picture), the volume of data for transmission can be large for that encoded picture, which can be very sensitive to data packet loss. In addition, when data packet loss occurs and re-transmission of the I-picture is needed, the transmission thereof can cause a burst of data rate, which is not network-friendly. The aforementioned I-picture based scheme for coding and transmitting a video stream can be referred to as an "I-picture method" hereinafter. Compared with the I-picture method, by distributing the I-slices of a whole picture into several pictures of the video stream in a progressive way, the risk of decoding failure can be reduced. The transmission can become more network-friendly. The speed of decoding the first picture for rendering can also be faster.

The disclosed methods, apparatuses, and systems use the same I-slices as references for inter-prediction for a group of pictures; therefore, any data packet loss of any picture of that group will have a less significant impact on the decoding of the video stream. In other words, the video stream can become more "packet loss resilient." For example, if data packet loss occurs for the picture 708 that causes failure of decoding the same, the impact of such failure will be confined within the picture 708 because the picture 708 includes only P-pictures. That is, the decoding of other pictures (e.g., the pictures 702-706, or any picture temporally later than the picture 708) will not be affected by such failure. For another example, even if data packet loss occurs for the picture 702 and the decoding of the same fails, only decoding of slices co-located with $I0_0$ (e.g., P-slices $P0_1$, $P0_2$, $P0_3$, . . . $P0_{k-1}$) will be affected because the picture 702 only includes a portion of the I-slices (i.e., the I-slice $I0_0$). Decoding of slices co-located with the I-slices $I1_1$ and $I2_2$ (e.g., P-slices $P1_2$, $P1_3$, . . . $P1_{k-1}$, and P-slices $P2_3$, . . . $P2_{k-1}$) will not be affected as long as no data packet of $I1_1$ or $I2_2$ is lost during transmission. By re-transmitting the I-slice $I0_0$ (or, in some cases, the picture 702), inter-prediction referencing $I0_0$ can be re-performed, and all pictures having slices co-located with $I0_0$ can be restored. Compared with the I-picture method, the disclosed method for coding and transmitting the video stream can reduce picture inter-dependency for decoding, reduce sizes of data for re-transmission, and thus be more packet loss resilient.

Also, by distributing the I-slices within several pictures of the video stream in a progressive way, the number of bits used to code one picture can be reduced, and the bitrate of the compressed video stream can be more uniform. When data packet loss occurs, the disclosed method can also reduce bitrate bursts. For example, when data packets of the picture 702 are lost and re-transmission of the same is needed, the transmission thereof will cause a lower burst of bitrate. Compared with the I-picture method, the disclosed method for coding and transmitting the video stream can be more network-friendly.

In addition, in some implementations, by arranging the progressive I-slices at the beginning (e.g., the first few pictures) of the video stream, the time needed to decode the video stream at the decoder can be reduced or minimized. For a first group of pictures (e.g., the first group of pictures 702-710 in FIG. 7), because the pictures including the I-slices are the references for inter-prediction and transmitted at the beginning (e.g., in the pictures 702-706) of the video stream, the successive pictures of the first group can be decoded without relying on transmission of other pictures. Therefore, each picture of the first group can be decoded as soon as the transmission of the same is completed. Besides, whenever any I-slice is transmitted and decoded, the co-located slices of the successive pictures can be decoded without relying on transmission of any other slice of any picture. As an example, in a video webcast, multiple users can connect to the same source for broadcasting. When a new user is joining the webcast, the source (e.g., an encoding apparatus) can transmit pictures including I-slices to the new user (e.g., a decoding apparatus), upon which the video stream can be decoded almost instantly. Compared with the I-slice method, the disclosed method can decode the received video stream and render the pictures for a user in a shorter time, which can reduce the waiting or buffer time for the user and improve user experience.

Further, by using the progressive I-slice references, random access of the pictures in a transmitted video stream can be implemented upon receiving the I-slices. For example, in FIG. 7, upon receiving the I-slices $I0_0$, $I1_1$, and $I2_2$ at $t_0$, $t_1$, and $t_2$, respectively, the picture 706 can be reconstructed completely because the P-slices $P0_2$ and $P1_2$ can be decoded referencing $I0_0$ and $I1_1$, respectively. In other words, the reconstruction of pictures in the same group of pictures can be random, not relying on the order of reconstructing other pictures.

In some implementations, the number of pictures in a group of pictures can be flexible. In some cases, the number of pictures can be set as large to reduce data size for coding and transmission, such as for a video stream majorly including quasi-static pictures (e.g., for a webcasting with only the head and shoulders of an individual displayed in a static background). However, controlling the number of the pictures in each group can be needed for some video streams (especially for those with highly dynamic pictures). When the group of pictures includes many pictures, the I-slices can be far away from slices of later pictures (e.g., pictures near the end portion of the group), in which the similarity between the two may degrade. As the similarity degrades, ME and MC quality may also degrade, which can reduce the quality of the decoded pictures.

Figure 8:
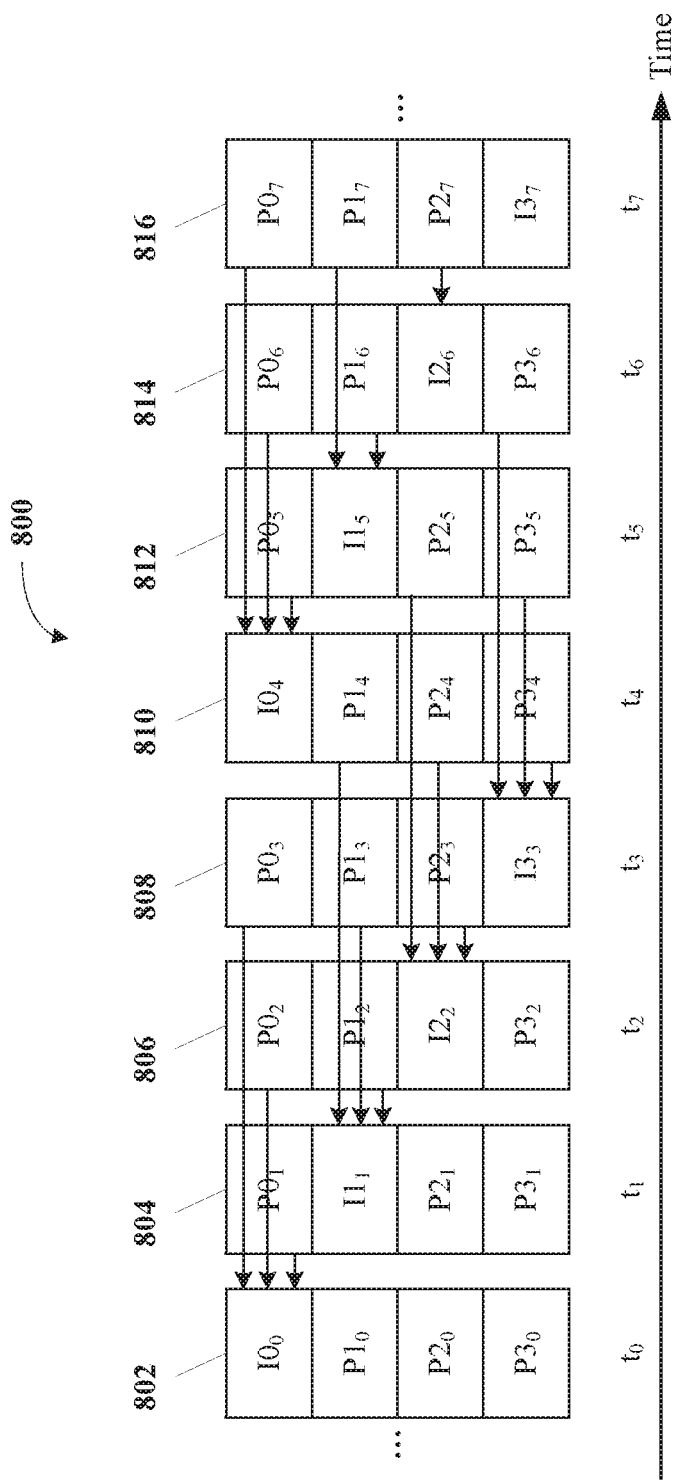
FIG. 8 is a diagram of pictures of a video stream showing second example progressive I-slice references according to implementations of this disclosure.

In some implementations, k (i.e., the number of pictures in the group of pictures) can be set as equal to m (i.e., the number of I-slices in a group of pictures). FIG. 8 is a diagram of pictures of a video stream 800 showing second example progressive I-slice references according to implementations of this disclosure. A timeline is shown in FIG. 8 indicating the direction of time. The video stream 800 can include two groups of pictures. The first group includes pictures 802-808. The second group includes pictures 810-816. Timestamps $t_0$ to $t_7$ are shown under the pictures 802-816, respectively.

In FIG. 8, the number of pictures in each group (i.e., k) is four. Each picture is divided into four slices. Each group can include four I-slices (i.e., m is also four), and each picture of the group can include one I-slice. In the first group of pictures, four I-slices $I0_0$, $I1_1$, $I2_2$, and $I3_3$ can be decoded using intra-prediction. In the second group of pictures, four I-slices $I0_4$, $I1_5$, $I2_6$, and $I3_7$ can be decoded using intra-prediction. The I-slices in each group can also be used as reference slices of inter-prediction for successive co-located P-slices (e.g., the successive co-located P-slices $P0_1$, $P0_2$, and $P0_3$ for the I-slice $I0_0$), which are indicated by the arrows in FIG. 8. The groups of pictures (e.g., the first and second groups) can include no P-picture.

By setting k as equal to m, such as shown in FIG. 8, each picture of the video stream can include one I-slice. In addition, the P-slices of the video stream can be decoded using I-slices not exceeding a certain time interval (e.g., not exceeding $t_3-t_0$). Therefore, in addition to maintaining the previously stated effects of the progressive I-slice references, the quality of the decoded pictures can also be further improved.

Figure 9:
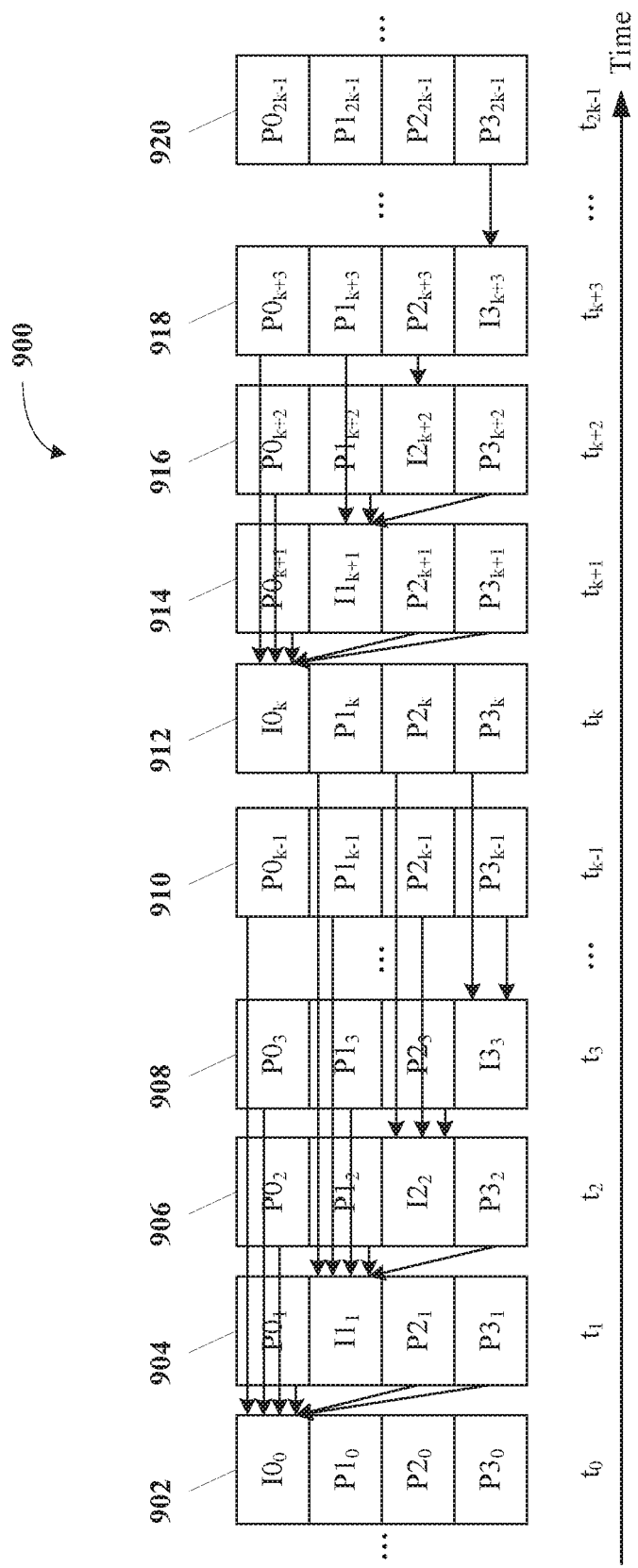
FIG. 9 is a diagram of pictures of a video stream showing third example progressive I-slice references according to implementations of this disclosure.

Referring back to the process 500, in some implementations, at least two slices of the second picture can be decoded using inter-prediction referencing the first I-slice. FIG. 9 is a diagram of pictures of a video stream 900 showing third example progressive I-slice references according to implementations of this disclosure. A timeline is shown in FIG. 9 indicating the direction of time. The video stream 900 can include groups of pictures. The first group includes pictures 902-910. The second group includes pictures 912-920. Timestamps are shown under some pictures, such as timestamps $t_0$ to $t_3$ corresponding to the pictures 902-908, respectively, and timestamps $t_{k-1}$ to $t_{k+3}$ corresponding to the pictures 910-918, respectively. In FIG. 9, each picture is divided into four slices.

In FIG. 9, when the first and second pictures are the pictures 902 and 904, respectively, and the first I-slice is the I-slice $I0_0$, at least two slices (e.g., slices $P0_1$, $P2_1$, and $P3_1$) of the picture 904 can be decoded using inter-prediction referencing the I-slice $I0_0$. Similarly, when the first and second pictures are the pictures 904 and 906, respectively, and the first I-slice is the I-slice $I1_1$, at least two slices (e.g., slices $P1_2$ and $P3_2$) of the picture 906 can be decoded using inter-prediction referencing the I-slice $I1_1$.

The aim of the configuration of coding the video stream as shown in FIG. 9 is to enable decoding of a picture as soon as possible. In other words, in some implementations, for a group of pictures in a received video stream, before receiving all I-slices in that group, the P-slices of the pictures can be decoded using as many available I-slices as possible. Those available I-slices can be co-located or not co-located with the P-slices. In some implementations, an available I-slice can be used as an inter-prediction reference for only P-slices in the successive picture. For example, as shown in FIG. 9, $I0_0$ can be used only for P-slices in the picture 904, and $I1_1$ can be used only for P-slices in the picture 906.

For example, in FIG. 9, the video stream can start at time $t_0$. That is, the picture 902 can be the first picture received at the decoder. At time $t_0$, the I-slice $I0_0$ can be decoded using intra-prediction. At time $t_1$, the I-slice $I1_1$ can be decoded using intra-prediction, and the available I-slices are $I0_0$ and $I1_1$. $P0_1$ is co-located with $I0_0$. $P2_1$ and $P3_1$ are not co-located with $I0_0$, and have no corresponding co-located I-slice available. However, by decoding $P0_1$, $P2_1$, and $P3_1$ referencing $I0_0$, the picture 904 can be reconstructed at time $t_1$ without waiting to receive the remaining I-slices. Similarly, at time $t_2$, the I-slice $I2_2$ can be decoded using intra-prediction, and the available I-slices are $I0_0$, $I1_1$, and $I2_2$. $P0_2$ and $P1_2$ have corresponding co-located I-slices $I0_0$ and $I1_1$, respectively. $P3_2$ is not co-located with $I0_0$ or $I1_1$, and has no corresponding co-located I-slice. By decoding $P3_2$ referencing $I1_1$, the picture 906 can be reconstructed at time $t_2$ without waiting to receive the remaining I-slices.

In some cases, especially at the beginning of the video transmission, the user might prefer rendering pictures instantly to having high-quality pictures. By using a coding configuration as shown in FIG. 9, such user preference can be fulfilled without significant compromising of picture quality. For example, for a video conference, an I-slice (e.g., $I0_0$) can be used for coding backgrounds, and the P-slices (e.g., $P0_1$, $P2_1$, and $P3_1$) in a successive picture (e.g., the picture 904) corresponding to the backgrounds can be decoded using the I-slice, although the P-slices are not all co-located with the I-slice. Because the backgrounds are less significant to the user (or the background is nearly static), such configuration will not compromise user experience significantly. Data of the individual faces can be included in another I-slice (e.g., $I1_1$) for intra-prediction, which can be decoded with higher quality. In those cases, the video stream can be rendered almost instantly (e.g., as soon as receiving the first picture of the stream), and the buffering time at the user end can be minimized.

Figure 10:
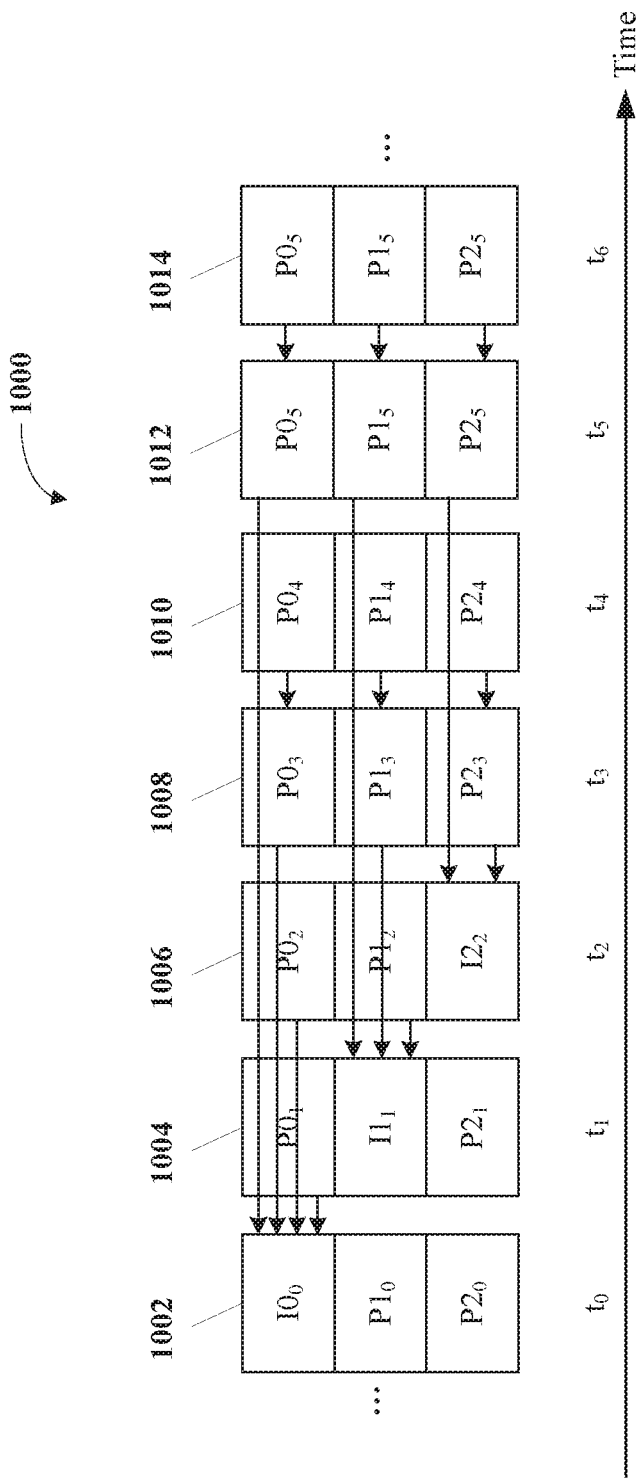
FIG. 10 is a diagram of pictures of a video stream showing fourth example progressive I-slice references according to implementations of this disclosure.

In some implementations, the referencing within a group of pictures can also be flexible. Referring back to the process 500, in some implementations, a future picture immediately after the current picture can be decoded using inter-prediction, in which all slices of the future picture can be decoded referencing respective co-located slices of the current picture. FIG. 10 is a diagram of pictures of a video stream 1000 showing fourth example progressive I-slice references according to implementations of this disclosure. A timeline is shown in FIG. 10 indicating the direction of time. The video stream 1000 can include pictures 1002-1014. Timestamps $t_0$ to $t_6$ are shown under the pictures 1002-1014, respectively. In FIG. 10, each picture is divided into three slices.

In FIG. 10, when the current picture is the picture 1008, the future picture immediately after the current picture can be the picture 1010. As shown in FIG. 10, all slices of the future picture 1010 (e.g., $P0_4$, $P1_4$, and $P2_4$) can be decoded using inter-prediction referencing respective co-located slices (e.g., $P0_3$, $P1_3$, and $P2_3$) of the current picture 1008. In other words, for inter-prediction decoding, P-slices of the video stream 1000 (e.g., P-slices $P0_3$, $P1_3$, and $P2_3$) can use the I-slices (e.g., $I0_0$, $I1_1$, and $I2_2$) or other P-slices (e.g., $P0_3$, $P1_3$, and $P2_3$) as references.

By using the configurations as shown in FIG. 10, the coding of the video stream can be adaptively adjusted to improve the quality of decoded pictures. For example, when the network is congested and risks of data packet loss are high, the P-slices of the video stream 1000 can be encoded and decoded using the progressive I-slice references (e.g., coding slices of the picture 1008 referencing slices of the I-slices $I0_0$, $I1_1$, and $I2_2$). When the network congestion is relieved and risks of data packet loss are low, the P-slices of the video stream can be encoded and decoded using successive slice references (e.g., coding slices of the picture 1010 referencing the slices of the picture 1008). Depending on the network conditions, the encoder and decoder can switch between different slice referencing for coding the video stream adaptively. In some cases, the referencing of the I-slices or the P-slices can be alternating.

The configurations of progressive I-slice references as described in FIGS. 7-10 can be determined by the encoder. Information for slice referencing can be stored in the compressed video stream, such as, for example, in supplemental enhancement information (SEI), a picture header, or a slice header. Such information can also be stored and transmitted in an out-of-band message. When the decoder receives such information, the decoder can process it and determine the proper progressive I-slice references.

Figure 6:
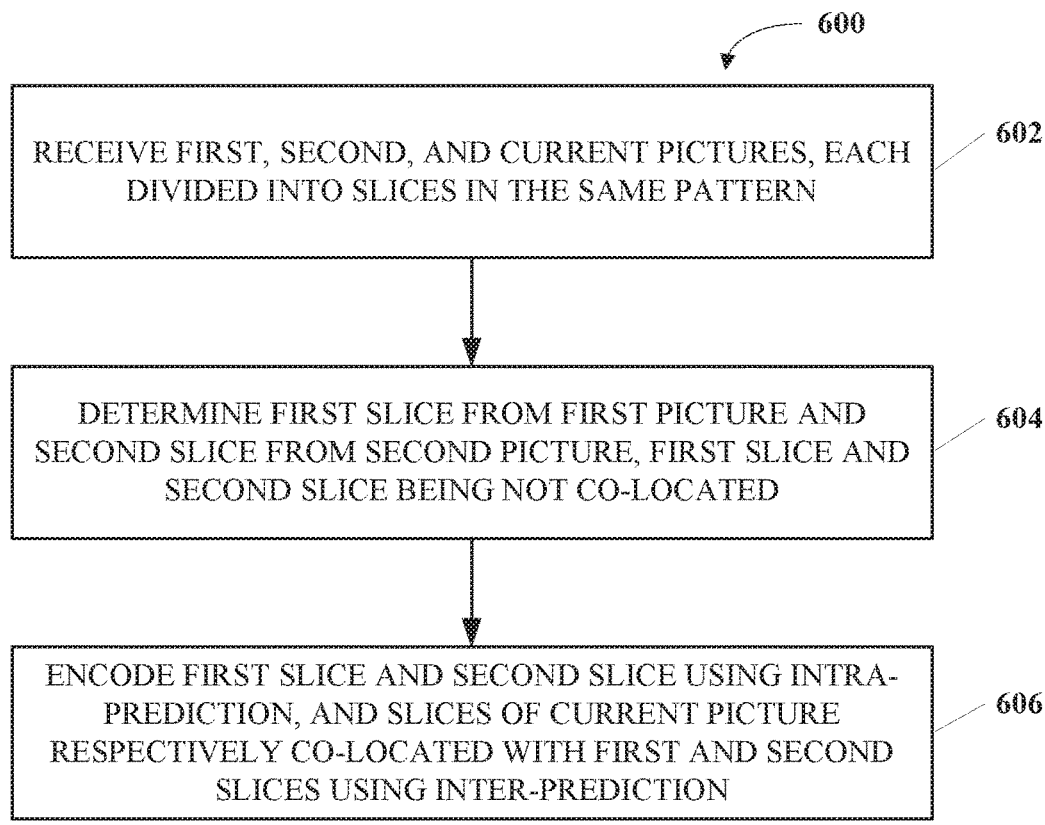
FIG. 6 is a flowchart of an example process for encoding a video stream using progressive I-slice references according to implementations of this disclosure.

FIG. 6 is a flowchart of an example process 600 for encoding a video stream using progressive I-slice references according to implementations of this disclosure. The process 600 can be implemented as software and/or hardware modules in the system 100 in FIG. 1. For example, the process 600 can be implemented as software modules stored in the memory 118 as instructions and/or data executable by the processor 116 of the apparatus 104 as an encoder. For another example, the process 600 can be implemented in hardware as a specialized chip storing instructions executable by the specialized chip. Some or all of the operations of the process 600 can be implemented at stages of the process 300 in FIG. 3.

At operation 602, a first picture, a second picture, and a current picture are received, each of which can be divided into slices in the same pattern. For example, as shown in FIG. 7, the video stream 700 can be a video stream for encoding. The first, second, and current pictures can be the pictures 702, 704, and 706, respectively. Each of the pictures 702-706 are divided into three slices in the same pattern as shown in FIG. 7.

At operation 604, a first slice and a second slice are determined from slices of the first picture and slices of the second picture, respectively. The first and second slices can be non-co-located with each other. That is, the first and second slices can correspond to different locations of a picture. For example, the first slice can be determined as the slice $I0_0$ of the first picture 702. The second slice can be determined as the slice $I1_1$ of the second picture 704. The first and second slices are not co-located, as shown in FIG. 7.

At operation 606, the first slice and the second slice are encoded using intra-prediction as a first I-slice and as a second I-slice, respectively, and a slice of the current picture co-located with the first I-slice and a slice of the current picture co-located with the second I-slice are encoded using inter-prediction referencing the first I-slice and referencing the second I-slice, respectively. For example, the first slice $I0_0$ and the second slice $I1_1$ can be encoded as I-slices using intra-prediction. A slice $P0_2$ of the current picture 706 co-located with $I0_0$ can be encoded as a P-slice using inter-prediction referencing $I0_0$. A slice $P1_2$ of the current picture 706 co-located with $I1_1$ can be encoded as a P-slice using inter-prediction referencing $I1_1$.

In some implementations, the operations 602-606 can be iterated for groups of pictures. For example, the video stream 700 can be divided into different groups of pictures (e.g., the first group including the pictures 702-710, and the second group including the pictures 712-720). The operations 602-606 can be performed to each of the divided groups.

For example, a first number of (e.g., k) pictures including the current picture can be received, each of which can be divided into a second number of (e.g., m) slices divided in the same pattern. For example, as shown in FIG. 7, the first number can be k, and the k pictures can be the pictures 702-710 with the timestamps $t_0$ to $t_{k-1}$. The second number m can be three as shown in FIG. 7. The k pictures 702-710 are divided into the same pattern.

When the k pictures are received, the m slices can be determined from the k pictures. None of the m slices can be co-located with each other. That is, the m slices can correspond to different locations of a picture. That is, none of the m slices can be co-located. Each of the k pictures can include at most one of the m slices. For example, for the first group of pictures of the video stream 700, three slices $I0_0$, $I1_1$, and $I2_2$ can be determined from the k pictures. The slices $I0_0$, $I1_1$, and $I2_2$ are not co-located with each other. That is, the slices $I0_0$, $I1_1$, and $I2_2$ correspond to different locations of a picture (e.g., the current picture 706). Each of the pictures 702-710 in the first group can include at most one of the three slices $I0_0$, $I1_1$, and $I2_2$. That is, some pictures (e.g., the pictures 702-706) can include one of the $I0_0$, $I1_1$, and $I2_2$, and some other pictures (e.g., the pictures 708-710) can include none of the determined slices $I0_0$, $I1_1$, and $I2_2$. It should be noted that m (e.g., 3) can be smaller than or equal to k.

When determined, the m slices can be encoded using intra-prediction as the m I-slices. In addition, a third number of (e.g., n) slices of the current picture can be encoded using inter-prediction referencing the n respective co-located I-slices of the m I-slices. For example, as shown in FIG. 7, the three determined slices $I0_0$, $I1_1$, and $I2_2$ can be encoded as I-slices using intra-prediction. The third number n can be 2. For example, two slices $P0_2$ and $P1_2$ of the current picture can be encoded as P-slices using inter-prediction referencing two respective co-located I slices $I0_0$ and $I1_1$. It should be noted that n (e.g., 2) can be smaller than or equal to m (e.g., 3).

It should be noted that the slices determined to be encoded as I-slices are not limited to the slices $I0_0$, $I1_1$, and $I2_2$. For example, when m is 3, any three pictures of the k pictures 702-710 can be selected, in each of which a slice can be determined for intra-prediction encoding. It should also be noted that the m determined slices for intra-prediction encoding can be distributed in consecutive or non-consecutive pictures. For example, the determined slices $I0_0$, $I1_1$, and $I2_2$ are distributed in the consecutive pictures 702-706 as shown in FIG. 7. For another example, the determined slices (not shown) can be distributed in non-consecutive pictures of the video stream 700, such as the pictures 702, 706, and 708. It should also be noted that, when the m determined slices are distributed in consecutive pictures, the consecutive pictures can be in any position of the group of pictures. For example, as shown in FIG. 7, the three consecutive pictures 702-706 including the determined slices $I0_0$, $I1_1$, and $I2_2$ are at the beginning of the k pictures 702-710. For another example, the three consecutive pictures 702-706 can be at a middle portion or an end portion of the k pictures 702-710 (not shown in FIG. 7). It should also be noted that the ordering of the locations of the m determined slices is not limited to the shown examples. For example, in the pictures 702-706 along the timeline, the determined slices $I0_0$, $I1_1$, and $I2_2$ are arranged from top to bottom. For another example, the determined slices can be selected in any random location of the pictures, such as $I0_0$, $I2_1$, and $I1_2$, or $I2_0$, $I0_1$, and $I1_2$ in three pictures along the timeline (not shown).

In some implementations, the m determined slices can be complementary to cover a whole picture. For example, in FIG. 7, the determined slices $I0_0$, $I1_1$, and $I2_2$ are complementary, and a combination thereof can cover a whole picture.

As used herein, the term "progressive" for an encoder refers to a way of determining slices for intra-prediction encoding, such that the more pictures are encoded, the more slices of those pictures are encoded as I-slices. Those encoded I-slices can be aggregated to cover a whole picture in an incremental fashion. For example, for encoding the video stream 700, when the picture 702 is encoded, the slice $I0_0$ can be encoded as an I-slice and used for inter-prediction encoding of co-located slices in the pictures 704-710. The encoded I-slice $I0_0$ can constitute a portion (e.g., one-third) of a whole picture. When the picture 704 is encoded, the I-slice $I1_1$ can be encoded as an I-slice and used for inter-prediction encoding of co-located slices in the pictures 706-710. The encoded I-slices $I0_0$ and $I1_1$ can be aggregated to constitute a larger portion (e.g., two-thirds) of the whole picture. That is, the aggregation of the encoded I-slices is in the incremental fashion. The encoded I-slices $I0_0$ and $I1_1$ can also be referred to as "progressive I-slice references" herein.

In some implementations, when the first group of pictures (e.g., the first group including the pictures 702-710) are encoded using the progressive I-slice references, a successive group of pictures (e.g., the second group including the pictures 712-720) can be encoded using the progressive I-slice references based on a new set of I-slices.

For example, after receiving the k pictures including the current picture, a fourth number of (e.g., p) pictures can be received, each of which can include the m slices divided in the same pattern. In some implementations, p can be equal to k. For example, the k pictures can be the pictures 702-710, and the p pictures can be the pictures 712-720 (i.e., p is equal to k). Each of the p pictures can include three (i.e., m is 3) slices divided in the same pattern as the k pictures 702-710.

When the p pictures are received, a slice of a picture in the p pictures can be encoded using inter-prediction referencing one of the second I-slices. The slice of the picture can be co-located with the one of the second I-slices. For example, for the picture 712, a P-slice $P1_k$ can be encoded using inter-prediction referencing the I-slice $I1_1$. Similarly, the P-slices $P2_k$ of the picture 712 and $P2_{k+1}$ of the picture 714 can be encoded referencing the I-slice $I2_2$.

In some implementations, p can be unequal to k. For example, starting from the time $t_0$, a group of pictures (e.g., the pictures 702-710) of the video stream 700 can be received and encoded using a set of selected slices encoded as I-slices (e.g., the slices $I0_0$, $I1_1$, and $I2_2$). After a predetermined time $t_{k-1}$, a new group of pictures (e.g., the pictures 712, 714, 716, . . . ) of the video stream 700 can be received and encoded using a new set of selected slices encoded as I-slices (e.g., the slices $I0_k$, $I1_{k+1}$, and $I2_{k+2}$). The number of pictures in the new group can be equal or unequal to the first group. In other words, a predetermined time period (e.g., $t_{k-1}$ minus $t_0$, or $t_{k-1}-t_0$) can be used at the encoder to control when to encode a new group of pictures based on a new set of selected slices for intra-prediction encoding.

Referring back to the process 600, in some implementations, k (i.e., the number of pictures in the group of pictures) can be equal to m (i.e., the number of determined slices in a group of pictures for intra-prediction encoding). For example, in FIG. 8, the number of pictures in each group (i.e., k) is four. In the first group that includes the pictures 802-808, four slices (i.e., m is also four) $I0_0$, $I1_1$, $I2_2$, and $I3_3$ are determined for intra-prediction encoding. In the second group that includes the pictures 810-816, four slices $I0_4$, $I1_5$, $I2_6$, and $I3_7$ are determined for intra-prediction encoding. The determined slices are used as reference slices of inter-prediction for successive co-located P-slices (e.g., for the I-slice $I0_0$, the successive co-located P-slices are $P0_1$, $P0_2$, and $P0_3$).

In some implementations, at least two slices of the second picture can be encoded using inter-prediction referencing the first I-slice. For example, as shown in FIG. 9, when the first picture is the picture 902, the second picture is the picture 904, and the first I-slice is the I-slice $I0_0$ in the picture 902, at least two slices (e.g., slices $P0_1$, $P2_1$, and $P3_1$) of the picture 904 can be encoded using inter-prediction referencing the I-slice $I0_0$. Similarly, when the first picture is the picture 904, the second picture is the picture 906, and the first I-slice is the I-slice $I1_1$, at least two slices (e.g., slices $P1_2$ and $P3_2$) of the picture 906 can be encoded using inter-prediction referencing the I-slice $I1_1$. The aim of the configuration of encoding the video stream as shown in FIG. 9 is to enable decoding of a picture as soon as possible in random access, as previously described.

In some implementations, a future picture immediately after the current picture can be encoded using inter-prediction, in which all slices of the future picture can be encoded referencing respective co-located slices of the current picture. For example, as shown in FIG. 10, when the current picture is the picture 1008, the future picture immediately after the current picture can be the picture 1010. As shown in FIG. 10, all slices of the future picture 1010 (e.g., $P0_4$, $P1_4$, and $P2_4$) can be encoded using inter-prediction referencing respective co-located slices (e.g., $P0_3$, $P1_3$, and $P2_3$) of the current picture 1008. In other words, for inter-prediction encoding, some P-slices of the video stream 1000 (e.g., P-slices $P0_3$, $P1_3$, and $P2_3$) can use the I-slices (e.g., $I0_0$, $I1_1$, and $I2_2$) or other P-slices (e.g., $P0_3$, $P1_3$, and $P2_3$) as references. By using the configurations as shown in FIG. 10 for encoding, the coding of the video stream can be adaptively adjusted to improve the quality of coded pictures, as previously described.

As described above, a person skilled in the art will note that all or a portion of aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination.

The aspects herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

The terms "signal" and "data" are used interchangeably herein. Further, portions of the computing devices do not necessarily have to be implemented in the same manner. Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding a compressed video stream, comprising:
   decoding, by a processor from the compressed video stream, a group of pictures,
      wherein each picture of the group of pictures consisting of a same number of slices,
      wherein the slices being arranged in a same pattern such that boundaries of the slices across the pictures of the group of pictures having same relative locations in the pictures,
      wherein no picture of the group of pictures being such that all slices of the picture are decoded using intra-prediction, and wherein decoding the group of pictures comprising:
- decoding a first picture of the group of pictures and a second picture of the group of pictures, wherein the first picture comprises a first I-slice decoded using intra-prediction, the second picture comprises a second I-slice decoded using intra-prediction, and the first I-slice and the second I-slice are not co-located with each other;
- decoding a first P-slice of a current picture of the group of pictures referencing the first I-slice, wherein the first P-slice of the current picture is co-located with the first I-slice; and
- decoding a second P-slice of the current picture referencing the second I-slice, wherein the second P-slice of the current picture is co-located with the second I-slice.

2. The method of claim 1, wherein at least two P-slices of the second picture are decoded referencing the first I-slice.

3. The method of claim 1, further comprising:
decoding a future picture immediately after the current picture, wherein all slices of the future picture are decoded referencing respective co-located slices of the current picture.

4. The method of claim 1, further comprising:
decoding, by the processor from the compressed video stream, k pictures, each comprising m slices in the same pattern, wherein k and m are positive integers, the k pictures comprise m I-slices decoded using intra-prediction, none of the m I-slices are co-located with each other, and each of the k pictures comprises at most one of the m I-slices; and
decoding n P-slices of the current picture referencing n respective co-located I-slices of the m I-slices, wherein n is a positive integer smaller than or equal to m.

5. The method of claim 4, wherein the m I-slices are complementary to form a virtual picture having an area equal to an area of a whole picture of the compressed video stream.

6. The method of claim 4, wherein the k pictures comprise m consecutive pictures, and each of the m consecutive pictures comprises one of the m I-slices.

7. The method of claim 6, wherein the m consecutive pictures are decoded at the beginning of the k pictures.

8. The method of claim 4, wherein m is equal to k.

9. The method of claim 4, further comprising:
decoding, by the processor from the compressed video stream after decoding the k pictures, p pictures, wherein p is a positive integer and each of the p pictures comprises m slices in the same pattern; and
decoding a P-slice of a picture of the p pictures referencing one of the m I-slices, wherein the P-slice is co-located with the one of the m I-slices.

10. The method of claim 9, wherein p is equal to k.

11. A method for encoding a video stream, comprising:
encoding, by a processor, a group of pictures,
- wherein the group of pictures comprising a first picture, a second picture, and a current picture,
- wherein each picture of the group of pictures being partitioned into an equal number of slices having a same pattern such that boundaries of the slices in the pictures having same relative locations,
- wherein no picture of the group of pictures being such that all slices of the picture are encoded using intra-prediction, and
- wherein encoding the group of pictures comprising:
  - determining a first slice from slices of the first picture and a second slice from slices of the second picture, wherein the first and second slices are not co-located with each other; and
  - encoding, using intra-prediction, the first slice of the first picture as a first I-slice;
  - encoding, using intra-prediction, the second slice of the second picture as a second I-slice;
  - encoding, using inter-prediction and referencing the first I-slice, a first current slice of the current picture that is co-located with the first I-slice; and
  - encoding, using inter-prediction and referencing the second I-slice, a second current slice of the current picture that is co-located with the second I-slice.

12. The method of claim 11, further comprising:
encoding, using inter-prediction, at least two slices of the second picture referencing the first I-slice.

13. The method of claim 11, further comprising:
encoding, using inter-prediction, a future picture immediately after the current picture, wherein all slices of the future picture are encoded referencing respective co-located slices of the current picture.

14. The method of claim 11, further comprising:
receiving, by the processor, k pictures including the current picture, each of the k pictures divided into m slices in the same pattern, wherein k and m are positive integers;
determining the m slices from the k pictures, wherein none of the m slices are co-located with each other, and each of the k pictures comprises at most one of the m slices; and
encoding, using intra-prediction, the m slices as m I-slices, and, using inter-prediction, n slices of the current picture referencing n respective co-located I-slices of the m I-slices, wherein n is a positive integer smaller than or equal to m.

15. The method of claim 14, wherein the m I-slices are complementary to form a virtual picture having an area equal to an area of a whole picture of the video stream.

16. The method of claim 14, wherein the k pictures comprise m consecutive pictures, and each of the m consecutive pictures comprises one of the m slices.

17. The method of claim 16, wherein the m consecutive pictures are received at the beginning of the k pictures.

18. The method of claim 14, wherein k is equal to m.

19. The method of claim 14, further comprising:
receiving, by the processor after receiving the k pictures, p pictures, wherein p is a positive integer and each of the p pictures is divided into m slices in the same pattern; and
encoding, using inter-prediction, a third slice of a picture of the p pictures referencing one of the m I-slices, wherein the slice is co-located with the one of the m I-slices.

20. The method of claim 19, wherein p is equal to k.

* * * * *